United States Patent [19]

Stufflebeam et al.

[11] 3,982,773
[45] Sept. 28, 1976

[54] FOLDING FRAME STRUCTURE FOR AGRICULTURAL IMPLEMENTS

[75] Inventors: John F. Stufflebeam, Romeoville; Charles Boetto, Naperville, both of Ill.

[73] Assignee: International Harvester Company, Chicago, Ill.

[22] Filed: Dec. 4, 1975

[21] Appl. No.: 637,785

[52] U.S. Cl. ............................. 280/656; 172/456
[51] Int. Cl.$^2$ .................................. B62B 11/00
[58] Field of Search ............ 280/639, 656, 638, 39, 280/42; 172/456

[56] References Cited
UNITED STATES PATENTS

| | | | |
|---|---|---|---|
| 2,973,818 | 3/1961 | Marvin | 280/656 |
| 3,162,459 | 12/1964 | Marmorine | 280/656 |
| 3,428,333 | 2/1969 | Nelson | 280/656 |
| 3,606,848 | 9/1971 | Dobbs | 172/456 |

*Primary Examiner*—Robert R. Song
*Attorney, Agent, or Firm*—F. David AuBuchon; Floyd B. Harman

[57] ABSTRACT

A tractor drawn agricultural implement of the folding wing type having right and left toolbar frames, the inner ends of which are pivoted to a tongue or drawbar for horizontal swinging movement about closely spaced vertical axes between extended operative positions of end-to-end alignment and folded positions wherein the frames lie close to each other in trailing relationship with respect to the drawbar. The outer ends of the frames are independently supported upon lift wheels of the caster type which do not leave the ground during swinging movement of the frames. A hydraulic cylinder on the drawbar has a plunger which operates through the medium of a pair of thrust links to swing the frames between their two extreme positions. Latch means normally maintains the frames extended but a cam element on the plunger trips the latch means at the commencement of the plunger stroke, thereby freeing the frames for movement to their folded positions.

16 Claims, 9 Drawing Figures

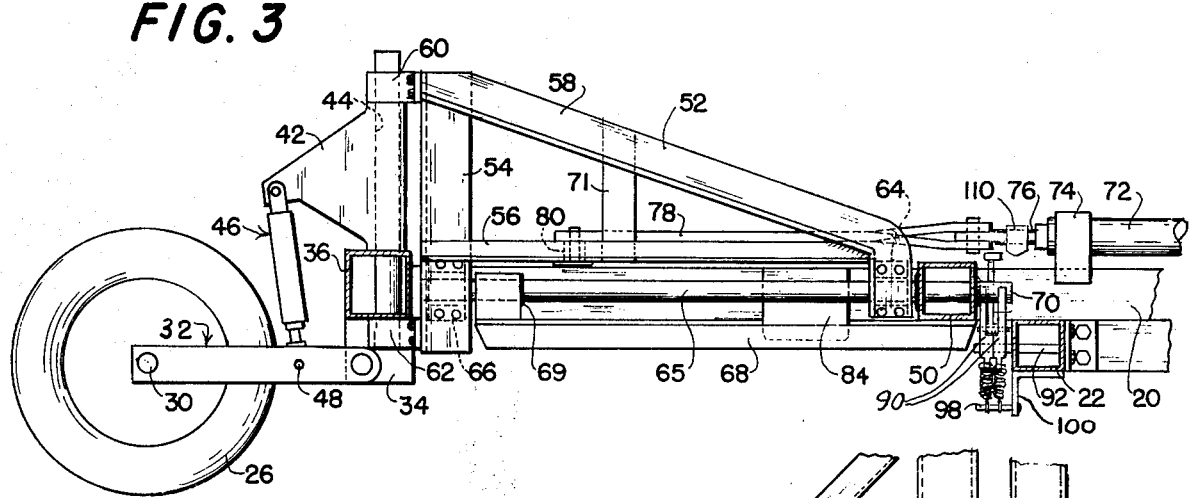
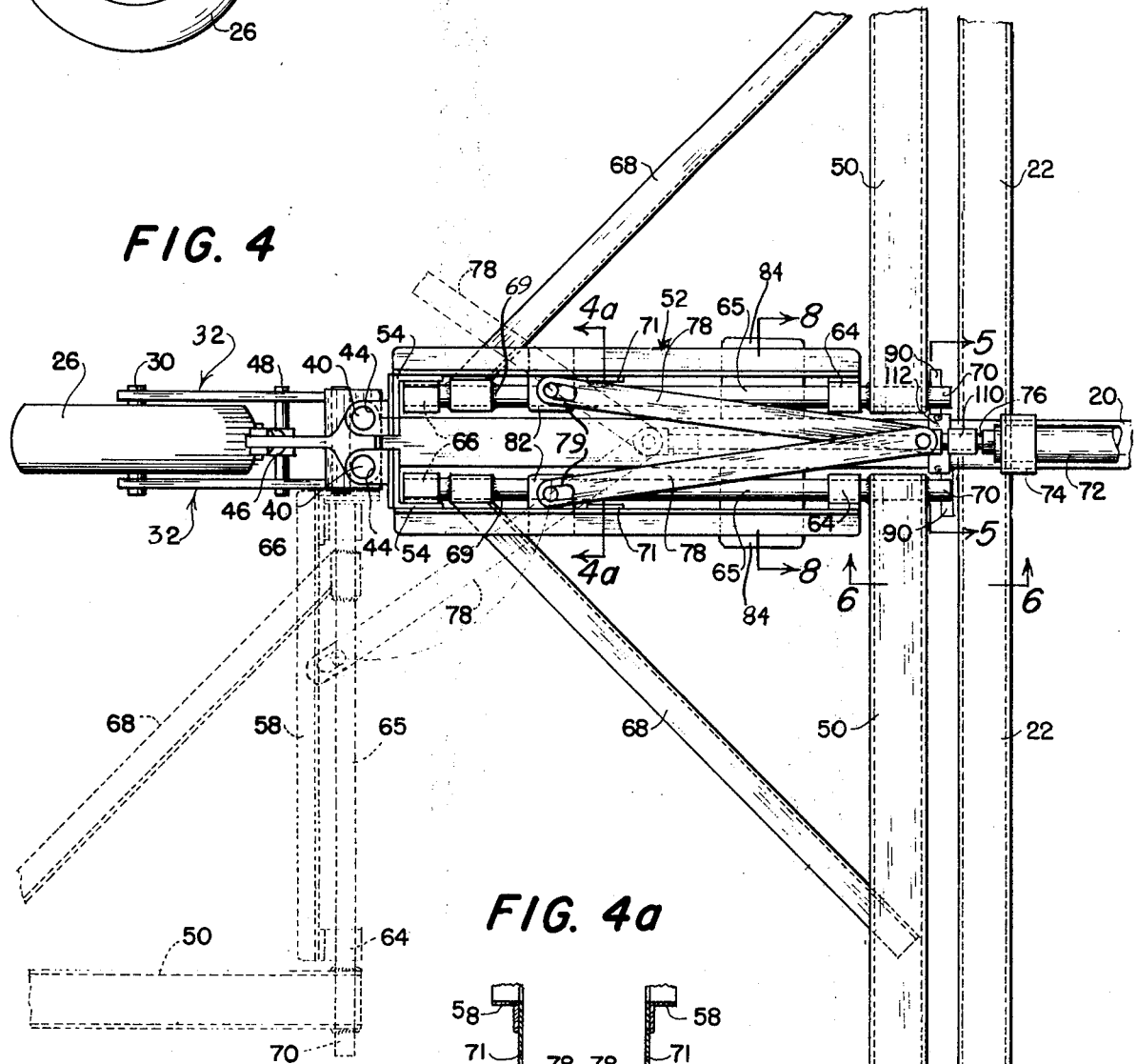
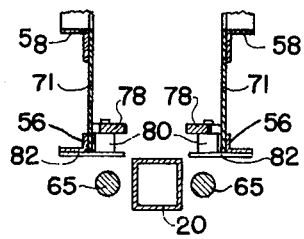

FOLDING FRAME STRUCTURE FOR AGRICULTURAL IMPLEMENTS

The present invention relates to agricultural implements, especially large implements, and has particular reference to a novel folding wing or frame structure for such implements. For environmental purposes herein, the invention has been shown and described in connection with a multi-row seed-dispensing planter but it is to be distinctly understood that the invention is equally applicable to other agricultural implements which are adapted to work large swaths of ground in a single pass, as for example gang cultivators, harrows, rotary hoes and other implements too numerous to mention.

In connection with such large implements, problems have arisen in adapting them so that they can be transported along a highway or moved through narrow spaces such as gates, or between farm or other buildings. One method of solving this problem has been to provide wing gang couplings which enable the extension wing frames to be folded at least partially upwardly and over the main frame, thereby materially reducing the overall width of the implement for transport purposes. Such a method possesses the obvious disadvantage that the wider the implement when in its operating condition, the higher it will be when folded, thus giving rise to obstruction by overhead objects such as bridges, wires, trees and the like. Where seed-dispensing planters which frequently carry seed hoppers, fertilizer or chemical bins are concerned, it is necessary that such hoppers and bins be at least partially emptied to avoid spilling of the contents thereof when the extension wings or frames are upended. Furthermore, in connection with such folding implements, the entire weight of the upended wings or frames is borne by the central main frame and this places an undue load upon the ground-engaging traction wheels which support such main frame.

Another method of solving the problem of adapting large agricultural implements for transportation along highways or passage through narrow spaces has been to employ caster wheel supported outrigger end frame sections which are pivoted to the outer ends of a central or main frame section for swinging movement through an angle of 90° horizontally between extended positions of alignment with the main central frame section and trailing inoperative positions wherein they are disposed in the longitudinal direction of the implement. Manually releasable locking means are provided whereby each outrigger frame may be held in either position. This latter method is possessed of several limitations, when the swinging frames are outrigger frames; the trailing positions thereof are not truly "folded" positions inasmuch as in such trailing positions the frames remain spaced from each other by a distance substantially equal to the transverse extent of the central or main frame. The reduction in width of the folded implement is thus minimal. A second limitation resides in the fact that with such implements, especially if they are of appreciable size, movement of the outrigger frames between their extended and trailing positions must be accomplished by forward or rearward movement of the tractor as the case may be, the reaction force which is exerted by the ground on the caster wheels being relied upon for motivating the required swinging movement of the outrigger frames. This leads to difficulty in maneuvering the implement for turnabout operations at the end of a given planting swath. Finally, operator dismounting is necessary to attend to release of the outrigger frame unlocking facilities. Devices such as these are shown in U.S. Pat. Nos. 3,493,248 and 1,776,860.

The present invention is designed to overcome the above-noted limitations that are attendant upon the design and construction of both vertically and horizontally folding agricultural implement frames and, toward this end, the invention contemplates the provision of an agricultural implement of the folding wing or frame type, herein exemplified by a mobile seed planter, having right and left toolbar frames the inner or proximate ends of which are pivoted to a tongue or drawbar for horizontal swinging movement about closely spaced vertical axes between extended operative positions of end-to-end alignment and trailing or folded positions wherein such toolbar frames lie close to each other and extend in the longitudinal direction of the drawbar or tongue. The outer or distal ends of the two toolbar frames are independently supported upon caster lift wheels which do not leave the ground during swinging movement of the frames between their extended and their folded positions and thus such caster wheels normally assume forward directional positions when the frames are extended. The caster wheels are capable of directionally following the arcuate path of swinging movement of the outer ends of the toolbar frames but become restored to their forward directional positions after the toolbar frames have become folded and as soon as forward motion of the folded planter commences. By such an arrangement, the toolbar frames are at all times fully tractionally supported and there is no concentration of ground-supported weight in the central region of the planter when the latter is in its folded condition. Further, because the two toolbar frames are pivoted to the tongue at closely spaced points which, when the frames are in their extended positions, lie at the rear proximate corners of the frames, the trailing positions of such frames bring the two frames into substantial contiguity so that the overall width of the folded implement is scarcely wider than twice the width of the transverse width of either toolbar frame.

An important feature of the present invention resides in the provision of hydraulically operable means for positively shifting the toolbar frames between their extended and their trailing positions, such means assuming the form of a cylinder and plunger arrangement which is mounted on the tongue or drawbar by means of which the implement is drawn and which operates through spreader links to perform the shifting operation. Control valve means which is readily accessible to the operator seated on the tractor enables such operator to effect the desired shifting of the toolbar frames without having to dismount. Moreover, frame shifting operations may be accomplished while the implement is stationary so that the previously mentioned difficulty which is involved in maneuvering the implement for turnabout purposes is completely eliminated.

An equally important feature of the invention involves the provision of a latch means for automatically maintaining the toolbar frames in their extended positions, such means becoming effective whenever such frames move to their positions of alignment and without necessitating any attention whatsoever on the part of the operator. Then, at such time as it is desired to shift the toolbar frames to their trailing positions, actuation of the aforementioned control valve means by the operator in order to project the plunger and cause the spreader links to move the toolbar frames automatically causes release of the latch means by reason of a cam which is disposed on the plunger and which, upon initial projection of the plunger, trips the latch means and thus releases it to allow continued movement or projection of the plunger to effect the required swinging movement of the toolbar frames.

The provision of an agricultural implement such as has briefly been outlined above and possessing the stated advantages constitutes the principal object of the present invention. Numerous other objects and advantages, not at this time enumerated, will readily suggest themselves as the nature of the invention is better understood.

In the accompanying four sheets of drawings forming a part of this specification, one illustrative embodiment of the invention has been shown.

BRIEF DESCRIPTION OF THE DRAWINGS

In these drawings:

FIG. 3 is an enlarged sectional view taken substantially on the line 3—3 of FIG. 1 with certain parts omitted in the interest of clarity and in order to more clearly reveal the nature of the invention;

FIG. 4 is a top plan view of the structure shown in FIG. 3;

FIG. 4a is a sectional view taken substantially on the line 4a—4a of FIG. 4;

FIG. 8 is an enlarged sectional view taken substantially on the line 8—8 of FIG. 4 with certain parts removed in the interests of clarity.

DETAILED DESCRIPTION OF THE DRAWINGS

Figure 1:
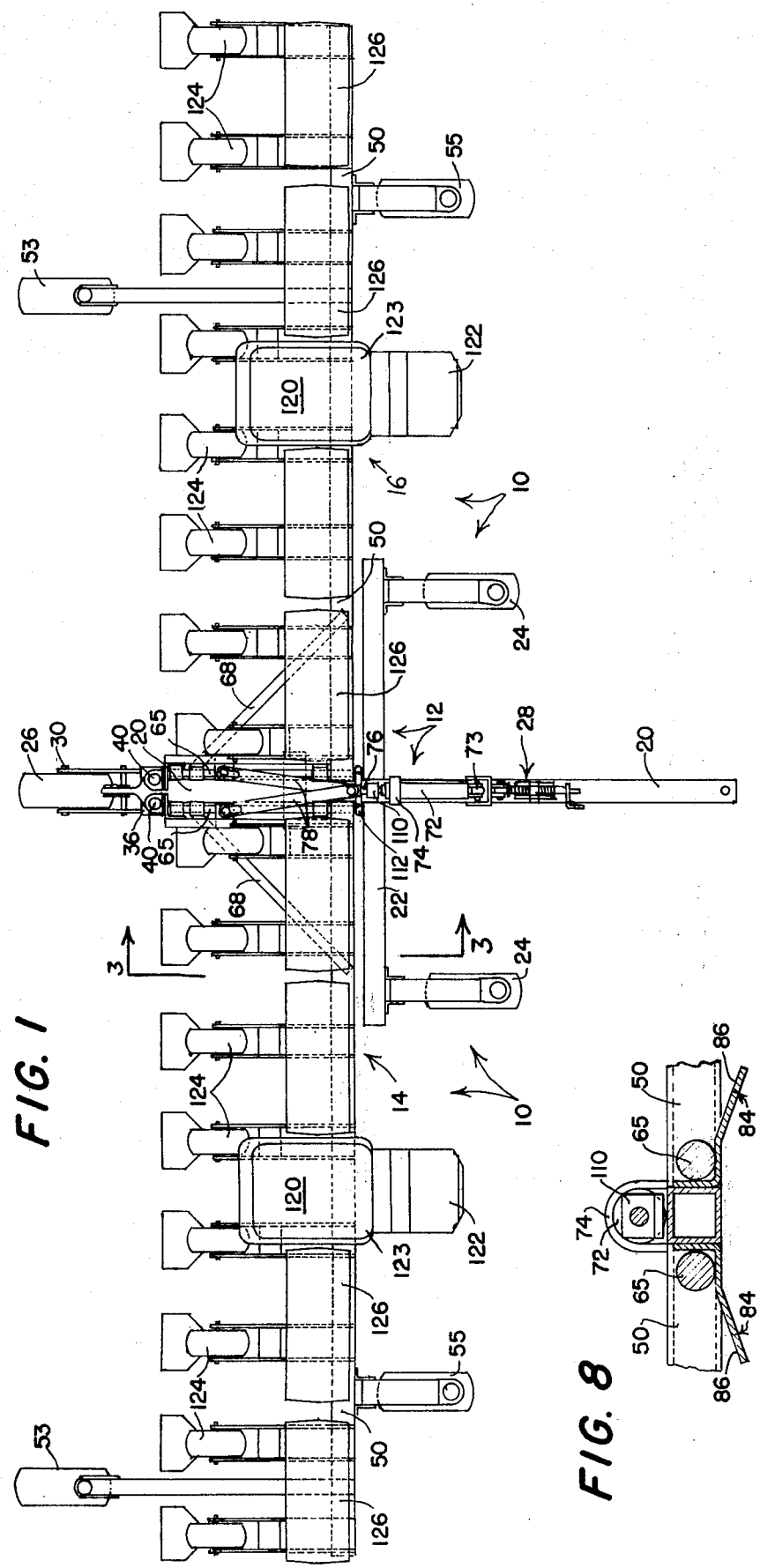
FIG. 1 is a plan view of a mobile folding seed-dispensing planter constructed in accordance with the principles of the present invention and showing the same in its operative unfolded or extended condition.
Figure 2:
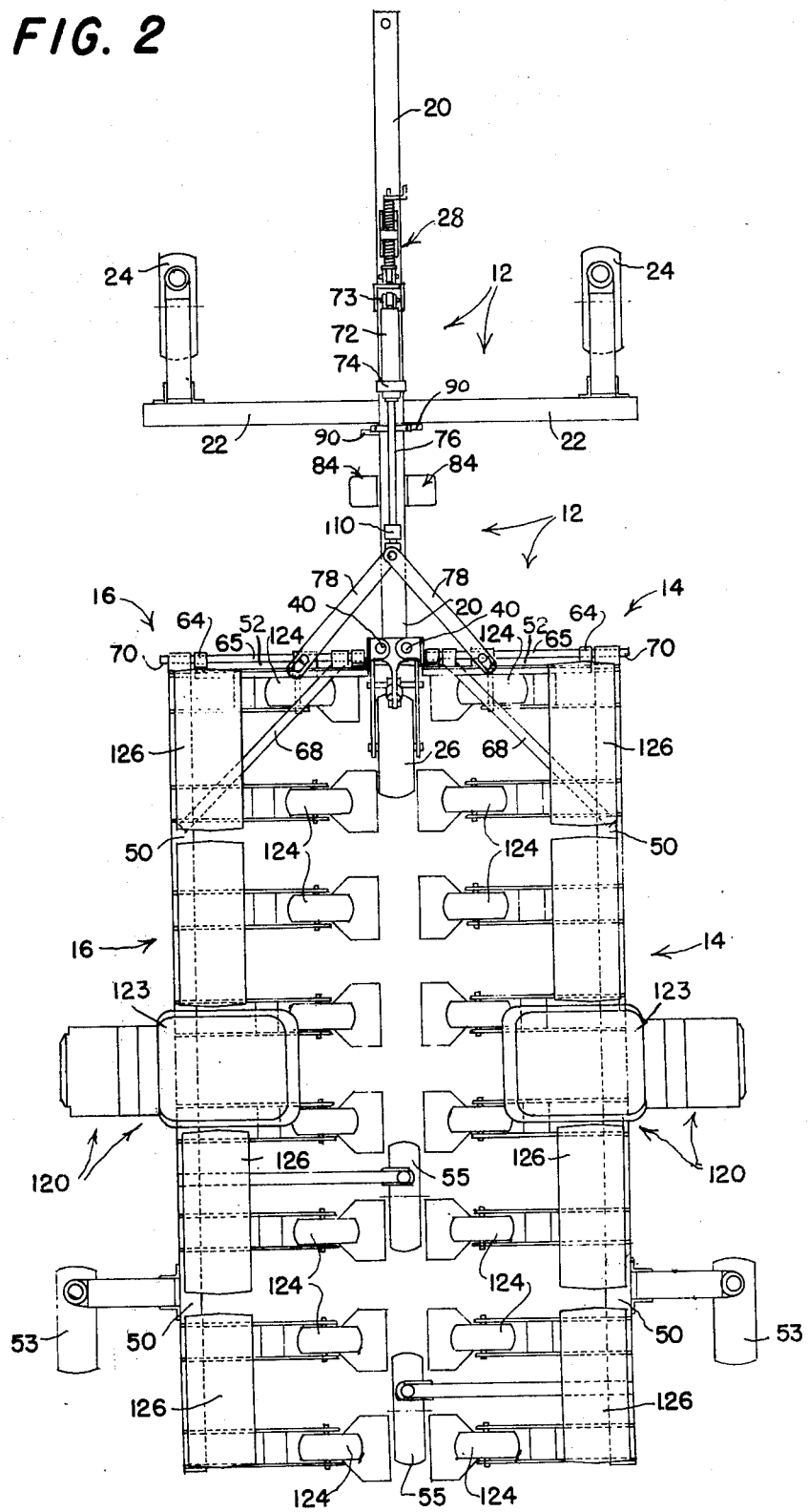
FIG. 2 is a plan view of the planter, showing the same in its inoperative folded transport condition.

Referring now to the drawings in detail, and in particular to FIGS. 1 and 2, a mobile folding seed-dispensing planter embodying the present invention is designated in its entirety by the reference numeral 10 and it involves in its general organization three principal rigid frame-like structures including a central carrying frame 12, and left and right toolbar frames 14 and 16 respectively, the directional references being as viewed from the front of the planter 10 looking rearwardly.

The central carrying frame 12 is generally of cross shape configuration and it includes a longitudinally extending tubular frame bar 20 which is square in transverse cross section, and a transverse tubular frame bar 22 which likewise is square in transverse cross section. The frame 12 is supported by three wheels including a pair of forward caster wheels 24 and a single non-castering or directionally fixed rear wheel 26. The caster wheels are carried at the outer ends of the transverse frame bar 22, while the directionally fixed wheel 26 is carried at the rear end of the longitudinally extending frame bar 20. As will be set forth in greater detail presently, all of the ground-engaging wheels associated with the planter 10, including the wheels 24 and 26, are lift wheels, which is to say that they have associated therewith hydraulic cylinder means whereby the frame structures which they support may be raised and lowered relative to the ground.

The longitudinally extending frame bar 20 is designed for attachment to a tractor (not shown) and thus such frame bar, in addition to performing other functions that will be made clear subsequently, constitutes in effect a tongue or drawbar whereby the planter 10 as a whole may be drawn by the tractor. The directionally fixed wheel 26 at the rear end of the frame bar or tongue 20 is fixed directionally so that it acts as a pivot and stabilizer for caster wheels 24 as well as the entire planter whether extended or folded. All other wheels of the implement are of the castering type thus the non-castering fixed wheel 26 enables the implement to follow the path of travel of the tractor. The frame bar 20 or tongue has associated therewith a leveling mechanism 28 of the type used on plows and disc harrows. For a more detailed understanding of such leveling mechanism, reference may be had to U.S. Pat. No. 3,516,499, the entire disclosure of which insofar as it is consistent with the present disclosure is hereby incorporated in and made a part of the present application.

The specific mounting for the wheel 26 is best shown in FIGS. 3 and 4 wherein it will be observed that the wheel axle 30 is carried at the rear end of a pair of fork arms 32, the forward or proximate ends of which are pivoted to a plate 34 which depends from a short transversely and horizontally extending tubular member 36. The member 36 is welded or otherwise secured to the extreme end of the frame bar or tongue 20 and, in addition to supporting the depending plate 34, also supports a pair of vertical pivot posts 40, such posts being spaced apart a slight distance and projecting completely through the tubular member 36. Mounted on the posts 40 and resting on the tubular member 36 is a generally triangular reaction bracket 42, the vertical rear edge of which is formed with a pair of vertical bores 44 (FIG. 4) which receive therethrough the pivot posts 40. The rear apex of the triangular bracket 42 constitutes an anchor point for the upper end of a hydraulic lift cylinder 46, the lower end of such lift cylinder being pivoted to a cross pin 48 which projects between the pair of fork arms 32 in the medial region thereof.

Referring again to FIGS. 1 and 2, the right and left toolbar frames 14 and 16 are substantially identical in construction except for the fact that each such frame is of complementary design with respect to the other. Therefore a description of one of them will suffice for them both. Each frame is generally of L-shape design and embodies an elongated toolbar 50 and a lateral frame member 52 having a generally triangular shape and pivotally supports a rock shaft 65, the details of which are best shown in FIG. 3. The toolbar 50 is tractionally supported by a forward caster wheel 55 and a rear caster wheel 53, such wheels being disposed close to the outer end of the toolbar 50. Hydraulic lift means are provided for raising and lowering such wheels relative to the tool bar and will be described in detail subsequently. The lateral frame members 52 are of right triangular configuration and includes a vertical anglepiece (FIGS. 3 and 4) 54, a horizontal anglepiece 56 and an inclined anglepiece 58, the latter consituting the hypotenuse of the triangle. The vertical anglepiece 54 extends alongside a respective vertical pivot post 40 and is pivoted for swinging movement about such post throughout an angle of 90° by means of upper and lower bearing assemblies 60 and 62, the upper bearing assembly encompassing the upper projecting portion of the pivot post 40 immediately above the triangular reaction bracket 42, and the lower bearing assembly encompassing the projecting portion of the post immediately below the short tubular member 36 as best shown in FIG. 3.

The lower end portion of the vertical anglepiece 54 overhangs the horizontal anglepiece 56 and the forward lower end of the inclined anglepiece 58 is turned downwardly and also overhangs the horizontal anglepiece 56. The over-hanging portion of the anglepiece 58 supports a bearing assembly 64 for the forward end region of a pivot or rock shaft 65. The rear end of the pivot or rock shaft 65 is rotatably supported in a bearing assembly 66 which is mounted on the overhanging lower end region of the vertical anglepiece 54. A brace bar 68 has one end welded as indicated at 69, (FIGS. 3 and 4) to the pivot shaft 65 in the vicinity of the bearing assembly 66 and has its other end similarly welded to a medial region of the associated toolbar 50, the brace bar 68, pivot shaft 65 and toolbar 50 defining approximately a right isosceles trinagle having equal base angles. The extreme forward end region of the pivot shaft 65 projects outwardly beyond the confines of the lateral frame member 52, passes completely through the toolbar 50 as indicated at 70, and is welded to the latter. A vertical strut 71 extends between the anglepieces 56 and 58.

From the above description it will be apparent that the right and left toolbar frames 14 and 16 are pivoted bodily as units to the central carrying frame 12, and more specifically to the rear end of the longitudinally extending frame bar 20, for swinging movement between extended positions wherein the toolbars 50 asociated therewith are in alignment and extend transversely of the planter 10 so as to form, in effect, a single elongated toolbar as shown in FIG. 1, and folded or trailing positions wherein the toolbars 50 extend in parallelism and in longitudinal directions as shown in FIG. 2.

Hydraulic means are provided whereby the right and left toolbar frames 14 and 16 may be power actuated between their extended and their folded positions. Accordingly, and as shown in FIGS. 1 to 4 inclusive, a hydraulic dual-acting cylinder 72 is fixedly mounted by a clevis 73 at its forward end and a strap 74 at its rear end to a medial region of the longitudinal frame bar or tongue 20. The cylinder 72 is provided with a plunger 76 which is connected to the forward ends of a pair of spreader links 78, the rear ends of such links being pivoted to posts 80 which are carried on plates 82 (FIGS. 4 and 4a) that are mounted on the medial regions of the horizontal bars 56. Lost motion slots 79 are formed in the rear ends of links 78 through which the pivot pins of posts 80 extend for a purpose to be discussed. As best shown in FIG. 4, when the plunger 76 is in its fully retracted position, the links 78 serve to maintain the lateral frame member 52 in close proximity to the longitudinally extending frame bar or tongue 20 and in parallelism therewith so that the toolbars 50 of the right and left toolbar frames 14 and 16 are disposed in end-to-end relationship or alignment as shown in FIG. 1. When the plunger 76 is extended, the links 78 are placed under compression and serve to swing the two toolbar frames 14 and 16 outwardly and rearwardly away from the frame bar or tongue 20 to their fully folded positions as shown in FIG. 2 wherein the links 78 are spread apart and the toolbars 50 extend in parallelism and in trailing relationship with respect to the central carrying frame 12.

Figure 5:
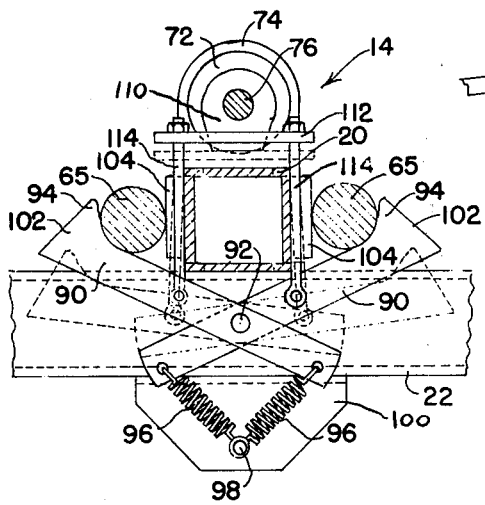
FIG. 5 is a further enlarged sectional view taken substantially on the line 5—5 of FIG. 4.

Means are provided for releasably latching the two toolbar frames 14 and 16 in their extended operative positions of alignment. Accordingly, a pair of ramp plates 84 (FIGS. 2, 3, 4, and 8) are secured to the longitudinal frame bar or tongue 20 on opposite sides thereof. The ramp plates 84 present upwardly inclined ramp surfaces 86 (see particularly FIG. 8) over which the pivot or rock shafts 65 ride at such time as the toolbar frames 14 and 16 move toward their final extended positions. These ramp plates 84 perform the function of bringing the pivot or rock shafts 65 into accurate cooperative relationship with a pair of latch levers 90 which appear in FIGS. 2, 3, and 4, and the details of which are more clearly shown in FIGS. 5 and 6. The latch levers 90 are pivoted in scissors fashion by means of a pin 92 to the transverse frame bar 22 of the central carrying frame 12 and are formed with hook-like rock shaft engaging protuberances 94 thereon which, when the two toolbar frames 14 and 16 are in their extended operative positions as shown in FIGS. 1 and 5, serve to embrace the outer sides of the rock shafts 65 and maintain them in closely nested relationship with respect to the central longitudinal frame bar or tongue 20. The latch levers 90 are normally maintained in their latching position as shown in full lines in FIG. 5 under the influence of a pair of tension springs 96 which are connected at their lower ends by means of a pin 98 to a bracket 100 which depends from the underneath side of the frame member 22 and are connected at their upper ends to the latch levers 90. The latch levers 90 are capable of being moved to the retracted positions shown in dotted lines in FIG. 5 in order to release the pivot or rock shafts 65, and consequently the toolbar frames 14 and 16 in their entirety, so that such frames may be moved to their folded positions. The two latch levers 90 are provided at their upper ends with cam surfaces 102 which are engaged by the pivot or rock shafts 65 at such time as the latter move toward their final positions against a pair of wear plates 104 which are secured to the opposite sides of the frame bar or tongue 20.

Figure 6:
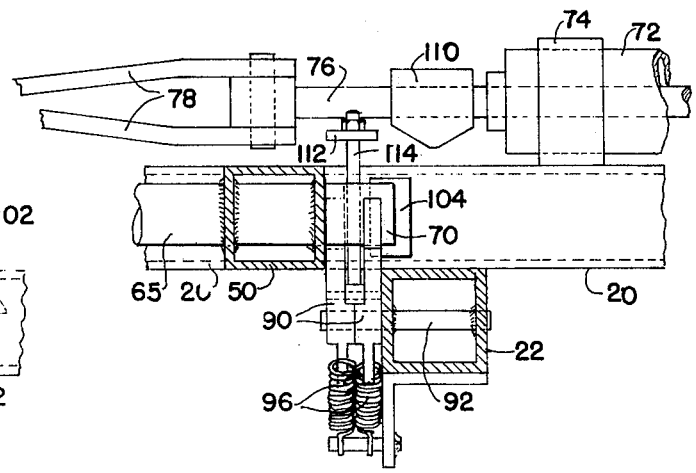
FIG. 6 is a sectional view taken substantially on the line 6—6 of FIG. 4.

Release of the pivot or rock shafts 65 is adapted to be effected under the control of the aforementioned dual-acting cylinder 72, the plunger 76 of which carries a cam 110 (FIGS. 2, 5, and 6) thereon. Such cam is designed for camming engagement with a cam plate 112 (see also FIGS. 3 and 4) which is carried at the upper ends of a pair of thrust links 114 which straddle the frame bar 20 and the lower ends of which are pivoted to the levers 90 respectively. Normally, because of the springs 96, the levers 90 are maintained in their raised latching positions so that the thrust links 114 maintain the cam plate 112 in the raised full line position in which it is shown in FIG. 5. In this raised position of the cam plate 112, the same is directly in the path of movement of the cam 110 so that at such time as the plunger 76 of the hydraulic cylinder 72 is moved to its projected position for toolbar frame shifting purposes in the manner previously described, the cam 110 moves into engagement with the cam plate 112. The cam 110 is disposed on the plunger 76 at a region which is close to the rear end of the cylinder 72 as shown in FIG. 6 when the plunger is fully retracted. Thus as soon as the plunger moves rearwardly at the commencement of its stroke, cam engagement is substantially immediate and upon depression of the cam plate 112, unlatching of the toolbar frames 14 and 16 takes place as set forth above. It should be noted that the lost motion slots 79 permit unlatching of rock shafts 64 prior to pivoting of the toolbar frames 14 and 16 above pivot posts 40. Continued motion of the plunger rearwardly, i.e., toward its fully projected position, serves to swing the frames 14 and 16 toward their folded position under the spreading influence of the links 78.

The folding wing arrangement described herein is applicable to a wide variety of agricultural implements but, for environmental purposes, it has been illustrated in connection with an automatic seed planter of the general type shown and described in U.S. Pat. No. 3,860,146, granted on Jan. 14, 1975 and entitled "Seed Dispensing Mechanism." Accordingly, the left and right toolbar frames 14 and 16 have associated therewith automatic seed-planting instrumentalities similar to those shown and described in the aforementioned U.S. Pat. No. 3,860,146, the disclosure of such instrumentalities herein being largely schematic in its representation. For a more detailed understanding of such seed-planting instrumentalities, reference may be had to such patent, the entire disclosure of which, insofar as it is consistent with the present disclosure, is hereby incorporated in and made a part of the present application.

Briefly, each toolbar frame 14 and 16 serves to support a seed-dispensing unit 120 embodying a horizontal rotary pressurized drum 122 (FIG. 7) having apertures 121 in the periphery thereof and in which seeds are individually captured by air pressure acting radially upon the seeds. The drum 122 is adapted to be driven under the influence of the forward tractional movement of the planter by a power train which appears in FIG. 7 and which leads from the ground wheel 55 and which will be more fully described subsequently. Seeds are delivered to the interior of the drum 122 from a pressurized hopper 123 which is maintained at a higher pressure level than that of the drum. A series of rubber or other elastomeric rollers (not shown) ride on the periphery of the drum and close off the apertures 121 so as to equalize the pressure on all sides of the seeds which then fall by gravity into a series of manifold seed passages (likewise not shown) leading to the various rows undergoing planting. At each row, the delivered seeds are embedded in the ground by the usual furrow-producing disks, furrow-closing disks or other devices, after which press wheels such as those indicated at 124 complete the ground preparation and seed planting work. Fertilizer hoppers, bins or containers 126 are suitably mounted in spaced relationship along the toolbar 50.

It is to be distinctly understood that all of the seed-dispensing and ground preparation devices illustrated herein schematically and briefly described or otherwise mentioned, are purely conventional and no claim is made herein to any novelty associated with the same, the novelty of the present invention residing rather in the previously described folding wing arrangement, its associated latching mechanism, and the hydraulic means for effecting the folding operation, as well as for actuating the latching mechanism. If desired other seed-dispensing arrangements which are not necessarily predicated upon the use of a power train leading from the ground wheel 55 may be employed for actuating the seed-dispensing unit 120.

It has previously been stated that all of the ground-engaging wheels associated with the planter 10 have associated therewith hydraulic cylinder means whereby the frame structures which they support may be raised or lowered relative to the ground. The specific lift mounting for the non-rotating directionally fixed wheel 26 at the rear of the frame bar or tongue 20 has been fully illustrated and described heretofore. The particular lift mountings for each of the front caster wheels 55 has not been illustrated in either FIGS. 1 or 2, but a disclosure thereof appears in FIG. 7 wherein it will be observed that the axle and fork support 130 for wheel 55 is carried at the forward end of a lift lever 132, the rear of inner end of which is pivoted to a bracket 134 mounted on the forward side of the toolbar 50. A hydraulic lift cylinder 136 is effective between a medial region of the lift lever 132 and the bracket 134 for swinging the lever 132 upwardly and downwardly to raise and fork support, and consequently the lift wheel 55 as desired.

Figure 7:
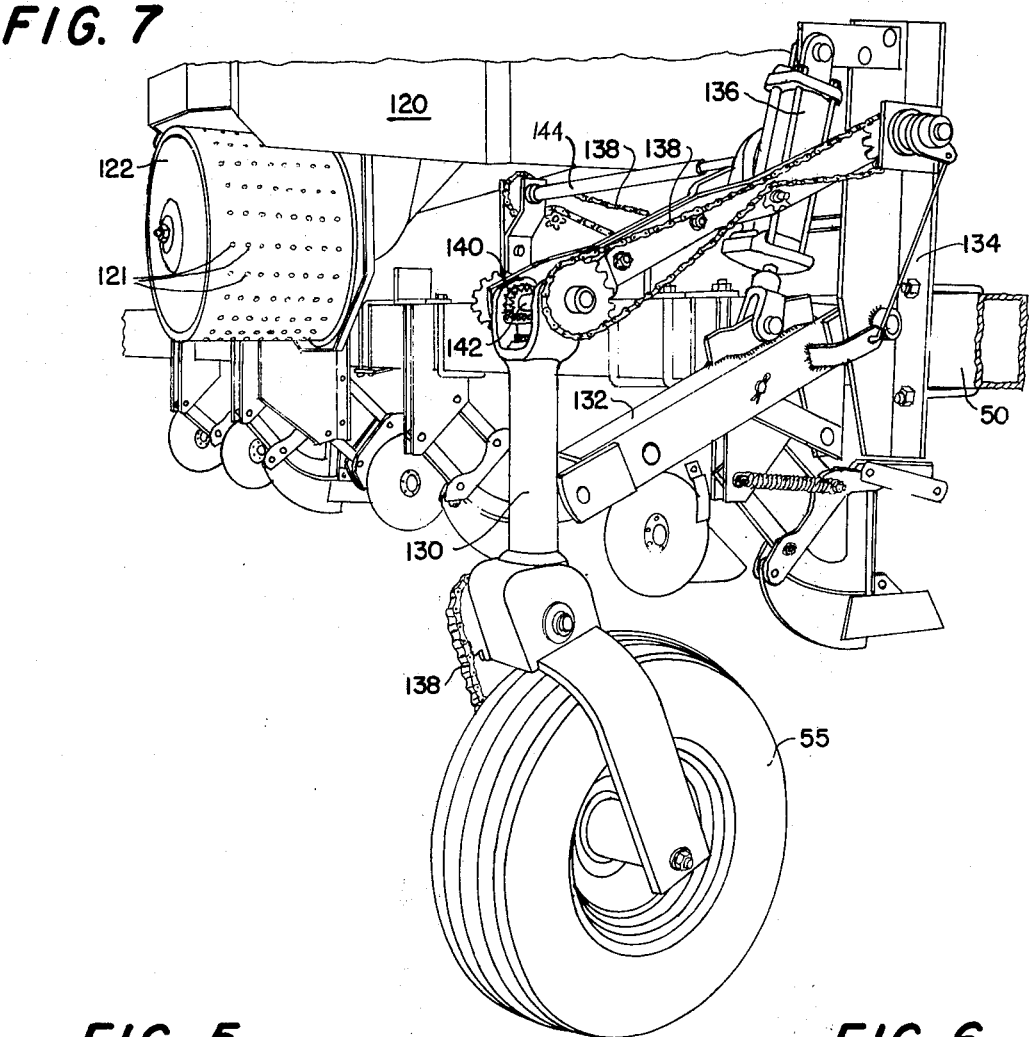
FIG. 7 is an enlarged fragmentary perspective view illustrating certain hydraulic lift mechanism which is associated with various caster lift wheels which are employed in connection with the planter.

The aforementioned power train leading from the lift wheel 55 to the seed-dispensing drum 122 appears fragmentarily as an incidental disclosure in FIG. 7. This power train, and in fact the manner in which the seed-dispensing mechanism associated with the seed-dispensing unit 120 functions, bears no relation to the present invention and it is deemed sufficient to state herein that the power train embodies various chain and sprocket devices which have collectively been designed by the reference numeral 138, bevel gear arrangements 140, gear clusters 142, torque-transmitting shafts 144 and other power transmitting devices, the net result of which is to transmit the rotary motion of the lift wheel 55 into corresponding rotary motion of the seed-dispensing drum 122. The seed dispensing unit 120 shown in FIG. 7 is only one that may be used in connection with the toolbar 50 and, as previously indicated, a wide variety of other seed-dispensing arrangements may be used if desired.

The hydraulic lift means for the rear caster wheels 53 of the left and right toolbar frames 14 and 16 are similar to the previously described hydraulic lift means for the forward caster wheels 55, it being understood, of course, that the various elements of the power train which are associated with the forward caster wheels 55 will be omitted. Caster wheels 53 extend rearwardly sufficiently to clear the planter units and are located at different distances from the center of the implement so that they will not interfere with each other when the frames 14 and 16 are folded. This permits the implement to fold to a narrower unit than if they were located at the same distance from the center of the implement.

SUMMARY OF THE INVENTION

In the operation of the herein described mobile folding seed-dispensing planter 10, it will be understood that shifting of the toolbar frames 14 and 16 from their extended positions of toolbar alignment as shown in FIG. 1 to their folded or trailing positions of toolbar parallelism as shown in FIG. 2, or vice versa, will always be accomplished while the lift cylinders associated with both the forward caster wheels 53 and the rear caster wheels 55 which support the toolbar frames 14 and 16 are in their lowered positions so that these frames are maintained in their raised or elevated position. With these toolbar frames thus elevated, all of the ground working tools such as the furrow establishing and furrow closing disks, the press wheels and any other ground preparation devices that may be employed in connection with the planter will be raised above ground level so as to offer no obstruction or resistance to free castering movement of the toolbar frames over the surface of the ground while such frames are being swung throughout their 90° angle of motion. The hydraulic devices whereby raising and lowering of the toolbar frames are accomplished may be actuated by suitable control valve means disposed in the vicinity of the operator's seat where it is readily assessible for manipulation. It is essential that the central carrying frame 12 also be raised and lowered in unison with the raising and lowering of the toolbar frames 14 and 16 such that all ground working tools are in the same relationship to the ground. It is therefore contemplated that the hydraulic devices which control the raising and lowering of the caster wheels 24 and the directionally fixed wheel 26 of the carrying frame 12 be operable under the influence of the same control valve which controls the operation of the caster wheels 53 and 55 or, alternatively, if different valves be employed, they be suitably synchronized.

Assuming now that the toolbar frames 14 and 16 are in their extended positions as shown in FIG. 1 and that it is desired to move them to their trailing positions as shown in FIG. 2. The operator will first actuate the control valve or other instrumentality which supplies fluid to the various lift cylinders 46, 136, etc., so that the carrying frame 12 and the right and left toolbar frames 14 and 16 will become raised as previously described. Thereafter the operator will cause fluid to be supplied to the cylinder 72 to project the plunger 76 and thus actuate the two spreader links 78 and place them under compression, thereby applying torque to the toolbar frames 14 and 16 through the media of the plates 82 and posts 80 (FIG. 4 and 4a) as previously described and tending to swing such frames through an angle of 90° to bring them to their trailing positions. During such swinging motion of the toolbar frames 14 and 16, very little resistance to free traveling movement of these frames will be offered due to the tendency for the various caster wheels 53 and 55 to trail the vertical spindle mountings with which they are associated. Ordinarily, during actual planting operations, the operator will complete his planting operations with the toolbar frames 14 and 16 in their extended positions and then effect wing folding operations while the planter is stationary to facilitate transport to a different area. After maneuvering the planter to the proper position in a different planting area, he will again cause the toolbar frames to become extended. Such extension of the toolbar frames is accomplished by causing the plunger 76 of the cylinder 72 to become retracted so as to place the spreader links 78 under tension and thus pull the toolbar frames 14 and 16 back to their extended positions as previously described.

It is pointed out that although the two latch levers 90 normally maintain the toolbar frames 14 and 16 in their extended positions as previously described in connection with FIG. 5, the initial projection of the plunger 76 from the cylinder 72 will cause the cam 110 to engage the cam plate 112 (see also FIG. 3), thus depressing the latter and placing the thrust links 114 under compression so as to release the latch levers 90 from the pivot or rock shafts 65, thus releasing the toolbar frames 14 and 16 for movement thereof to their trailing or folded positions, likewise as previously described. When the toolbar frames are undergoing restoration to their extended positions, the two latch levers 90 will be in their raised position under the influence of the springs 96 but they will offer no interference with movement of the toolbar frames to their final extended positions inasmuch as the pivot or rock shafts 65 will engage the cam surfaces 102 (FIG. 5) at the outer ends of these levers and momentarily push them aside until such shafts have passed over the outer ends of the levers.

It is to be noted at this point that whether the toolbar frames are in their extended positions or in their folded positions, such frames are free to follow the undulatory pattern of the ground over which the planter is traveling. This is due to the pivot or rock shafts 65 to which these frames 14 and 16 are fixedly secured. The various caster wheels which are associated with the frames are free to follow the ground pattern whether the frames are extended or folded and, in so doing, the pivot or rock shafts 65 will merely rotate or turn slightly in the bearings 64 and 66 (FIG. 3) which support them. Likewise the central carrying frame 12, being supported on its ground wheels 24 and 26 can follow the ground contour independently of the right and left toolbar frames 14 and 16 when the frames 14 and 16 are extended or folded.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a tractor-drawn agricultural implement, in combination, a folding frame structure including a central frame providing a drawbar adapted for connection to a tractor in trailing relationship, right and left toolbar frames each of which is generally of L-shaped configuration and includes a toolbar proper and a lateral frame member extending at a right angle thereto, the free ends of said lateral frame member being pivotally connected to the central frame at closely spaced points for swinging movement of the toolbar frames between extended operative positions wherein the toolbars extend transversely of the central frame and in end-to-end contiguity and the lateral frame members extend substantially parallel to the central frame, and trailing positions wherein said toolbars extend parallel to the central frame with said lateral frame members extending transversely of the central frame and in substantial end-to-end contiguity, at least one ground-engaging caster wheel operatively supporting each toolbar frame, lift means effective to raise and lower each toolbar frame relative to its associated caster wheel, means pivotally connecting each toolbar and its associated lateral frame member and effective to permit limited rocking movement of the former relative to the latter incident to undulatory travel of the caster wheel in any position of the associated toolbar frame, a hydraulic cylinder and plunger assembly effective between said central frame and toolbar frames for moving the latter between their extended and trailing positions, and releasable latch means normally maintaining said toolbar frames in their extended positions.

2. In an agricultural implement, the combination set forth in claim 1, wherein said means pivotally connecting each toolbar and its associated lateral frame member includes a pivot shaft fixedly secured to the toolbar for rocking movement in unison therewith, and bearing means are provided on the lateral frame member for rotatably supporting said pivot shaft.

3. In an agricultural implement, the combination set forth in claim 1, wherein said hydraulic cylinder and plunger assembly embodies a cylinder mounted on said central frame and a plunger operatively connected by a pair of thrust links to said lateral frame members and effective upon projection thereof to place the thrust links under compression and shift said toolbar frames from their extended positions to their trailing positions.

4. In an agricultural implement, the combination set forth in claim 3, wherein said releasable latch means embodies a pair of latch levers pivoted to said central frame and having hook-like protuberances designed for latching engagement with said toolbar frames when the toolbar frames are in their extended positions, and spring means yieldingly biasing said levers toward their latching positions.

5. In an agricultural implement, the combination set forth in claim 4 including, additionally, cam means automatically effective upon projection of the plunger to release said latch levers from their latching positions.

6. In an agricultural implement, the combination set forth in claim 5, wherein said cam means embodies a cam member mounted on said plunger and movable bodily therewith, and a cam plate connected by thrust links to said latch levers and disposed in the path of movement of said cam member.

7. In an agricultural implement, the combination set forth in claim 6, wherein said means pivotally connecting each toolbar and its associated lateral frame member includes a pivot shaft fixedly secured to the toolbar for rocking movement in unison therewith, and bearing means are provided on the lateral frame member for rotatably supporting said pivot shaft.

8. In an agricultural implement, the combination set forth in claim 1, said central frame member further embodies a transverse frame, ground-engaging caster wheels at the opposite ends of said transverse frame member, a directionally fixed ground-engaging wheel adjacent to the rear end of said central frame member, and lift means effective to raise and lower the central frame relative to its associated directionally fixed and caster wheels.

9. In an agricultural implement, the combination set forth in claim 8, wherein said releasable latch means embodies a pair of latch levers pivoted to said central frame member and having hook-like protuberances designed for latching engagement with said toolbar frames when the toolbar frames are in their extended positions, and spring means yieldingly biasing said levers toward their latching positions.

10. In an agricultural implement, the combination set forth in claim 9, wherein said hydraulic cylinder and plunger assembly embodies a cylinder mounted on said central frame member and a plunger operatively connected by a pair of thrust links to said lateral frame members and effective upon projection thereof to place the thrust links under compression and shift the toolbar frames from their extended positions to their trailing positions.

11. In an agricultural implement, the combination set forth in claim 10, wherein cam means are effective automatically upon projection of the plunger to release said latch levers from their latching positions.

12. In an agricultural implement, the combination set forth in claim 1, wherein said caster wheels extend rearwardly of said toolbars when said toolbar frames are in the extended operative position and wherein said caster wheels are located at different distances from the center of the implement such that they do not interfere with each other when the toolbar frames are in the trailing position.

13. In an agricultural implement, the combination set forth in claim 12, wherein said central frame member further embodies a transverse frame, ground-engaging caster wheels at the opposite ends of said transverse frame member, a directionally fixed ground-engaging wheel adjacent to the rear end of said central frame member, and lift means effective to raise and lower the central frame relative to its associated directionally fixed and caster wheels.

14. In an agricultural implement, the combination set forth in claim 13, wherein said releasable latch means embodies a pair of latch levers pivoted to said central frame member and having hook-like protuberances designed for latching engagement with said toolbar frames when the toolbar frames are in their extended positions, and spring means yieldingly biasing said levers toward their latching positions.

15. In an agricultural implement, the combination set forth in claim 14, wherein said hydraulic cylinder and plunger assembly embodies a cylinder mounted on said central frame member and a plunger operatively connected by a pair of thrust links to said lateral frame members and effective upon projection thereof to place the thrust links under compression and shift the toolbar frames from their extended positions to their trailing positions.

16. In an agricultural implement, the combination set forth in claim 15, wherein cam means are effective automatically upon projection of the plunger to release said latch levers from their latching positions.

* * * * *